(12) United States Patent
Measom et al.

(10) Patent No.: US 8,074,437 B2
(45) Date of Patent: Dec. 13, 2011

(54) RESIN-IMPREGNATED, STRUCTURAL FIBER ROPE

(75) Inventors: Ronald J. Measom, Hurst, TX (US); Frank Bradley Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 12/919,033

(22) PCT Filed: Feb. 28, 2008

(86) PCT No.: PCT/US2008/055320
§ 371 (c)(1),
(2), (4) Date: Aug. 24, 2010

(87) PCT Pub. No.: WO2009/108199
PCT Pub. Date: Sep. 3, 2009

(65) Prior Publication Data
US 2011/0000179 A1    Jan. 6, 2011

(51) Int. Cl.
*D02G 3/36*    (2006.01)

(52) U.S. Cl. .......................................................... 57/241
(58) Field of Classification Search .................... 57/232, 57/236, 237, 238, 241; 428/367, 375, 391, 428/394
See application file for complete search history.

(56) References Cited

U.S. PATENT DOCUMENTS

| 4,818,613 | A | * | 4/1989 | Ohtani et al. | 428/396 |
| 4,871,491 | A | * | 10/1989 | McMahon et al. | 264/29.2 |
| 4,874,563 | A | * | 10/1989 | McMahon et al. | 264/29.2 |
| 5,503,928 | A | * | 4/1996 | Cheshire | 428/357 |
| 6,045,906 | A | * | 4/2000 | McMahon et al. | 428/364 |
| 2002/0157765 | A1 | * | 10/2002 | Takeuchi et al. | 156/157 |
| 2011/0003150 | A1 | * | 1/2011 | Measom et al. | 428/367 |

* cited by examiner

*Primary Examiner* — Shaun R Hurley
(74) *Attorney, Agent, or Firm* — James E. Walton; Richard G. Eldredge

(57) ABSTRACT

A resin-impregnated, structural fiber rope includes a plurality of tows disposed in a bundle, each of the plurality of tows including a plurality of structural fibers, and uncured polymeric resin impregnated into the bundle. Each of the plurality of structural fibers defines an angle with respect to a central axis of the rope of no more than about 10 degrees.

10 Claims, 1 Drawing Sheet

RESIN-IMPREGNATED, STRUCTURAL FIBER ROPE

TECHNICAL FIELD

The present invention relates to fiber-reinforced, composite materials.

DESCRIPTION OF THE PRIOR ART

One particular class of fiber-reinforced, composite materials includes narrow, flat tape materials comprising a plurality of substantially parallel, structural fibers that are impregnated with an uncured polymeric resin, known as a "prepreg tape." Such tape materials are assembled or "laid-up" into plies, often using automated fiber placement processes, to form uncured, composite assemblies that are subsequently consolidated and cured, typically using heat and pressure, to form fiber-reinforced, composite workpieces. These tape materials typically exhibit generally rectangular cross-sections having large width-to-thickness aspect ratios.

It is often very desirable for the structural fibers in a ply of a composite workpiece to have a particular orientation with respect to the workpiece, so that the workpiece will have sufficient structural strength in a particular zone. Often, it is desirable for the orientation of structural fibers within a particular ply of the workpiece to be different within different zones of the workpiece. To achieve the desired fiber orientations, the prepreg tape material is steered during layup along a predetermined path. The structural fibers of such a prepreg tape material, however, impart significant stiffness to the tape, which limits the degree to which the tape material may be steered. This limit is known as the allowable "turning radius" of the material. Attempting to steer the prepreg tape beyond the allowable turning radius, i.e., along a path having a smaller radius than the allowable turning radius, causes buckling and wrinkling of the tape, which is very undesirable.

Attempts have been made to use composite prepreg forms comprising a plurality of substantially parallel, structural fibers that have small width-to-thickness ratios, such as forms that are generally round in cross-section, to produce fiber-reinforced composite workpieces. Because such forms include fewer structural fibers, these forms are much less stiff than large width-to-thickness aspect ratio forms. Automated equipment, such as automated fiber placement equipment, however, has difficulty feeding small width-to-thickness aspect ratio forms because of their low stiffness.

There are many designs of resin-impregnated, structural fiber forms well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
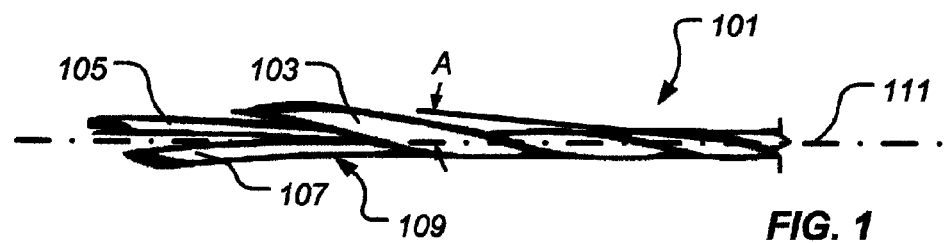
FIG. 1 depicts a stylized, side, elevational view of a first illustrative embodiment of a resin-impregnated, structural fiber rope.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A resin-impregnated, structural fiber rope comprises a plurality of tows that are loosely twisted about one another, are loosely braided, or are loosely plaited. The rope is impregnated with an uncured, polymeric resin. The tows move with respect to one another as the rope is being laid along contoured surfaces. This relative movement between tows allows the rope to be laid along small radii without wrinkling or buckling. The rope is generally round in cross-section, in one particular embodiment. The braiding or twisting of the tows contributes sufficient stiffness to the rope so that the rope can be used in automated fiber placement processes. Moreover, the twisting or braiding of the tows aids in retaining the tows in their rope configuration, thus eliminating the need for backing materials, which inhibit conventional fiber-reinforced, polymeric tapes from splitting while on storage rolls.

FIG. 1 depicts a stylized, side, elevational view of a first illustrative embodiment of a resin-impregnated, structural fiber rope 101. In the illustrated embodiment, rope 101 comprises a plurality of tows 103, 105, and 107. It should be noted that and end 109 of rope 101 is splayed to better reveal tows 103, 105, and 107. Each of tows 103, 105, and 107 comprises a bundle of twisted or untwisted structural fibers. Examples of such structural fibers include, but are not limited to, carbon fibers, graphite fibers, glass fibers, aramid fibers, and the like. Rope 101 is formed by twisting tows 103, 105, and 107 about one another, such that the absolute value of an angle A defined by any fiber of tows 103, 105, and 107 and a central axis 111 of rope 101 is no more than about 10 degrees and preferably no more than about 5 degrees.

In one embodiment, tows 103, 105, and 107 are individually twisted in a direction opposite the twist of rope 101 to help retain rope 101 in a twisted configuration. For example, if rope 101 is a right-hand twisted rope, then, in such an embodiment, tows 103, 105, and 107 are left-hand twisted tows. Conversely, in such an embodiment, if rope 101 is a left-hand twisted rope, then tows 103, 105, and 107 are right-hand twisted tows. Uncured resin that is impregnated into tows 103, 105, and 107 further aids in retaining rope 101 in a twisted configuration.

The resin impregnated into tows 103, 105, and 107 may comprise any suitable polymeric material. Examples of such materials include, but are not limited to, a thermoplastic polymer, a thermosetting polymer, a liquid crystal polymer, an epoxy, a polyamide-imide, a polyaryletherketone, a polyetheretherketone, a polyimide, a polyphenylene sulfide, a polyester, a vinyl ester, and the like.

Figure 2:
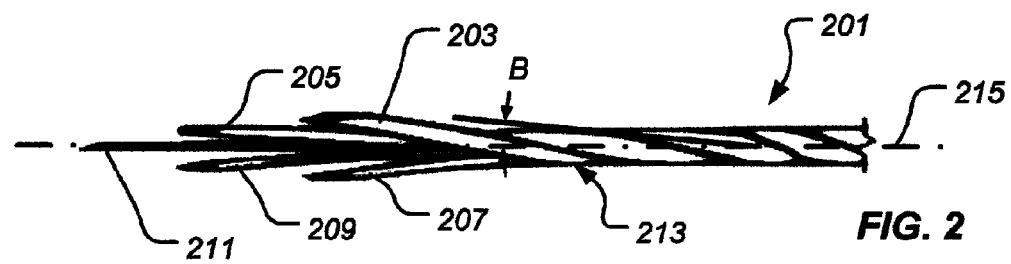
FIG. 2 depicts a stylized, side, elevational view of a second illustrative embodiment of a resin-impregnated, structural fiber rope.

While the particular embodiment of rope 101 comprises three tows, i.e., tows 103, 105, and 107, the scope of the present invention is not so limited. Rather, a resin-impregnated, structural fiber rope may comprise any desired, suitable number of tows, such as tows 103, 105, 107, and 109. For example, FIG. 2 depicts a stylized, side, elevational view of a resin-impregnated, structural fiber rope 201. In the illustrated embodiment, rope 201 comprises a plurality of tows 203, 205, 207, 209, and 211. It should be noted that and end 213 of rope 201 is splayed to better reveal tows 203, 205, 207, 209, and 211. Each of tows 203, 205, 207, 209, and 211 comprises a bundle of twisted or untwisted structural fibers. Examples of such structural fibers include, but are not limited to, carbon fibers, graphite fibers, glass fibers, aramid fibers, and the like. In the illustrated embodiment, rope 201 is formed by twisting tows 203, 205, 207, and 209 about tow 211, such that the absolute value of an angle B defined by any fiber of tows 203, 205, and 207 and a central axis 215 of rope 201 is no more than about 10 degrees and preferably no more than about 5 degrees.

In one embodiment, at least tows 203, 205, 207, and 209 are individually twisted in a direction opposite the twist of rope 201 to help retain rope 201 in a twisted configuration. For example, if rope 201 is a right-hand twisted rope, then, in such an embodiment, tows 203, 205, 207, and 209 are left-hand twisted tows. Conversely, in such an embodiment, if rope 201 is a left-hand twisted rope, then tows 203, 205, 207, and 209 are right-hand twisted tows. Uncured resin that is impregnated into tows 203, 205, 207, 209, and 211 further aids in retaining rope 201 in a twisted configuration.

The resin impregnated into tows 203, 205, 207, 209, and 211 may comprise any suitable polymeric material. Examples of such materials include, but are not limited to, a thermoplastic polymer, a thermosetting polymer, a liquid crystal polymer, an epoxy polymer, a polyamide-imide polymer, a polyaryletherketone polymer, a polyetheretherketone polymer, a polyimide polymer, a polyphenylene sulfide polymer, a polyester polymer, a vinyl ester polymer, and the like.

Figure 3:
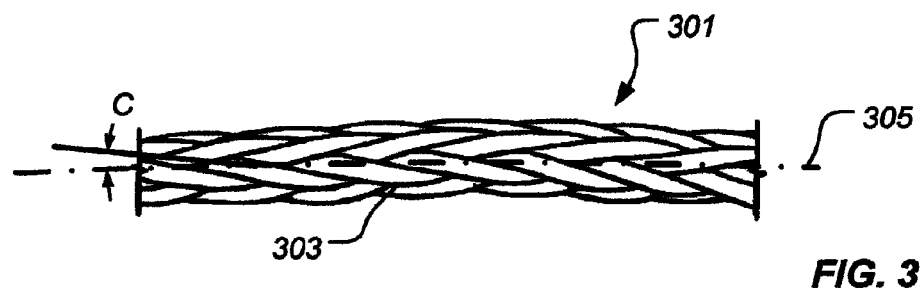
FIG. 3 depicts a stylized, side, elevational view of a third illustrative embodiment of a resin-impregnated, structural fiber rope.

Ropes 101 and 201, shown in FIGS. 1 and 2, respectively, have twisted forms. The scope of the present invention, however, is not so limited. Rather, a resin-impregnated, structural fiber rope may comprise a plurality of tows that has a woven or braided configuration. For example, FIG. 3 depicts a stylized, side, elevational view of a third illustrative embodiment of a resin-impregnated, structural fiber rope 301. In the illustrated embodiment, rope 301 comprises a plurality of tows, such as tow 303. Each of the tows comprises a bundle of twisted or untwisted structural fibers. Preferably, each of the tows comprises a bundle of untwisted structural fibers. Examples of such structural fibers include, but are not limited to, carbon fibers, graphite fibers, glass fibers, aramid fibers, and the like. Rope 301 is formed by braiding the tows, such that the absolute value of an angle C defined by any fiber of the tows, such as tow 303, and a central axis 305 of rope 301 is no more than about 10 degrees and preferably no more than about 5 degrees.

The resin impregnated into the tows, such as tow 303, may comprise any suitable polymeric material. Examples of such materials include, but are not limited to, a thermoplastic polymer, a thermosetting polymer, a liquid crystal polymer, an epoxy, a polyamide-imide, a polyaryletherketone, a polyetheretherketone, a polyimide, a polyphenylene sulfide, a polyester, a vinyl ester, and the like.

Figure 4:
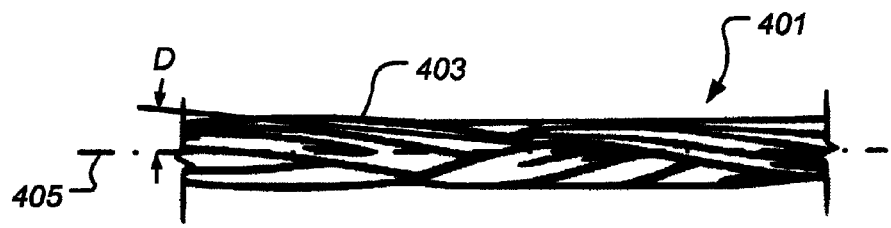
FIG. 4 depicts a stylized, side, elevational view of a fourth illustrative embodiment of a resin-impregnated, structural fiber rope.

Woven or braided forms other than that shown in FIG. 3 are contemplated by the present invention. For example, FIG. 4 depicts a stylized, side, elevational view of a fourth illustrative embodiment of a resin-impregnated, structural fiber rope 401. In the illustrated embodiment, rope 401 comprises a plurality of tows, such as tow 403. Each of the tows comprises a bundle of twisted or untwisted structural fibers. Preferably, each of the tows comprises a bundle of untwisted structural fibers. Examples of such structural fibers include, but are not limited to, carbon fibers, graphite fibers, glass fibers, aramid fibers, and the like. Rope 401 is formed by plaiting the tows, such that the absolute value of an angle D defined by any fiber of the tows, such as tow 403, and a central axis 405 of rope 401 is no more than about 10 degrees and preferably no more than about 5 degrees.

Resin-impregnated, structural fiber ropes 101, 201, 301, and 401 are generally round in cross-section, although other cross-sectional shapes are contemplated by the present invention. For example, a resin-impregnated, structural fiber rope may have a cross-sectional shape that is generally oval, rounded rectangular, or the like. In one particular embodiment, ropes 101, 201, 301, and 401 exhibit generally round cross-sectional shapes having diameters less than about 2 millimeters. In another embodiment, ropes 101, 201, 301, and 401 exhibit generally round cross-sectional shapes having diameters within a range of about 0.7 millimeters to about 1.6 millimeters.

The present invention provides significant advantages, including: (1) the ability to place fibers using automated fiber placement along small radii; (2) the ability to produce more complex parts by automated fiber placement than currently possible; and (3) the ability to provide material to an automated fiber placement machine without backing material.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A resin-impregnated, structural fiber rope, comprising:
   a plurality of tows disposed in a bundle, each of the plurality of tows including a plurality of structural fibers; and
   uncured polymeric resin impregnated into the bundle;
   wherein each of the plurality of structural fibers defines an angle with respect to a central axis of the rope of no more than about 10 degrees; and
   wherein the plurality of tows are twisted about one another.

2. The resin-impregnated, structural fiber rope, according to claim 1, wherein each of the plurality of structural fibers defines an angle with respect to a central axis of the rope of no more than about 5 degrees.

3. The resin-impregnated, structural fiber rope, according to claim 1, wherein the fibers of each of the plurality of tows are twisted about one another.

4. The resin-impregnated, structural fiber rope, according to claim 3, wherein the fibers of each of the plurality of tows are twisted about one another in a direction opposite to the twist direction of the rope.

5. The resin-impregnated, structural fiber rope, according to claim 1, wherein the plurality of fibers comprises a material selected from the group consisting of a thermoplastic polymer, a thermosetting polymer, and a liquid crystal polymer.

6. The resin-impregnated, structural fiber rope, according to claim 1, wherein the plurality of fibers comprises a material selected from the group consisting of an epoxy polymer, a polyamide-imide polymer, a polyaryletherketone polymer, a polyetheretherketone polymer, a polyimide polymer, a polyphenylene sulfide polymer, a polyester polymer, and a vinyl ester polymer.

7. The resin-impregnated, structural fiber rope, according to claim 1, wherein the rope exhibits a generally round shape in cross-section.

8. The resin-impregnated, structural fiber rope, according to claim 1, wherein the rope exhibits a diameter of less than about 2 millimeters.

9. The resin-impregnated, structural fiber rope, according to claim 1, wherein the rope exhibits a diameter within a range of about 0.7 millimeters to about 1.6 millimeters.

10. The resin-impregnated, structural fiber rope, according to claim 1, wherein the plurality of structural fiber comprises a material selected from the group consisting of carbon fibers, graphite fibers, glass fibers, and aramid fibers.

* * * * *